(12) United States Patent
Rowe

(10) Patent No.: US 6,421,459 B1
(45) Date of Patent: Jul. 16, 2002

(54) IMAGE PROCESSING APPARATUS

(75) Inventor: Simon Michael Rowe, Guildford (GB)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/153,041

(22) Filed: Sep. 15, 1998

(30) Foreign Application Priority Data

Sep. 16, 1997 (GB) .............................................. 9719694

(51) Int. Cl.⁷ .................................................. G06K 9/00
(52) U.S. Cl. ...................................... 382/154; 345/441
(58) Field of Search ................................. 382/154, 103, 382/104, 105, 106, 107, 108, 122; 345/125, 419, 420, 421, 422, 423, 424, 425, 441; 348/113, 116, 169, 170, 171, 172

(56) References Cited

U.S. PATENT DOCUMENTS

| | | | |
|---|---|---|---|
| 5,341,467 A | * 8/1994 | Klassen | 395/142 |
| 5,363,297 A | 11/1994 | Larson et al. | 364/410 |
| 5,511,153 A | 4/1996 | Azarbayejani et al. | 395/119 |
| 5,563,988 A | 10/1996 | Maes et al. | 395/121 |
| 5,671,086 A | * 9/1997 | Parvin | 359/391 |
| 5,714,997 A | 2/1998 | Anderson | 348/39 |
| 5,748,198 A | * 5/1998 | Takeda et al. | 345/441 |
| 5,809,161 A | * 9/1998 | Auty et al. | 382/104 |

FOREIGN PATENT DOCUMENTS

| | | |
|---|---|---|
| EP | 0 431 862 A2 | 6/1991 |
| EP | 0 669 758 | 8/1995 |
| EP | 0 773 516 | 5/1997 |
| EP | 0 794 516 | 9/1997 |
| WO | WO 95/08816 | 3/1995 |
| WO | WO 95/19093 | 7/1995 |
| WO | WO 96/31047 | 10/1996 |
| WO | 99/65223 | 12/1999 |

OTHER PUBLICATIONS

"Look Who's Talking: the GAZE Groupware System", Roel Voertegaal, Harro Vons and Robert Slagter, in Summary of ACM CHI'98 Conference on Human Factors in Computing Systems, Apr. 1998, Los Angeles, pp. 293–294.

"Computer and Robot Vision", vol. 2, R.M. Haralick et al., Addison–Wesly Publishing Co., 1993, ISBN 0–201–56943–4 (v.2), p. 583.

Pages printed from website of Visual Computing Laboratory, 9500 Gilman Drive, La Jolla, CA (May 1995): "Immersive Video", S. Moezzi et al.

"A Virtual Studio For Live Broadcasting: The Mona Lisa Project", Blondé et al., vol. 3, No. 2, Jun. 1996, pp. 18–28 XP 000594152.

* cited by examiner

Primary Examiner—Andrew W. Johns
Assistant Examiner—Seye D. Azarian
(74) Attorney, Agent, or Firm—Fitzpatrick, Cella, Harper & Scinto

(57) ABSTRACT

In an image processing system, a three-dimensional computer model is created of a real-world static background scene. Video images of objects moving on the background are recorded and processed to identify the portions of the image corresponding to the moving objects and to calculate the corresponding positions in the three-dimensional computer model. Each moving object is represented by at least one vertical plane in the three-dimensional computer model. Images, comprising the simulated background and the moving object planes onto which are rendered the video data of the moving object recorded by the video camera, are displayed to the user from any desired viewing direction(s).

35 Claims, 7 Drawing Sheets

IMAGE PROCESSING APPARATUS

BACKGROUND OF THE INVENTION

The present invention relates to an image processing apparatus and method for processing data representing moving pictures to generate a representation of the object(s) in the pictures in a three-dimensional computer model.

DESCRIPTION OF THE RELATED ART

At present, the content of images produced from video, or other moving picture, data depends on the viewing characteristics of the camera which captured the data. More particularly, the position from which objects are seen by a viewer is determined by the viewing position and viewing direction of the camera with respect to the scene.

As a solution to this constraint, interactive systems have been suggested in which video data is used to create a dynamic three-dimensional computer model of a scene, from which simulated views from any desired viewing direction can be created and displayed to a user. The present invention aims to provide an apparatus or method for use in implementing such an interactive system.

SUMMARY OF THE INVENTION

According to the present invention, there is provided an apparatus or method in which images of a moving object are processed to define a planar representation of the object in a three-dimensional computer model. The position of the object in an image is used to determine the position in the model and the image data corresponding to the object is used in its representation.

A plurality of planes may be used to represent the object.

The invention also provides an apparatus or method, in which planar surfaces are defined in a three-dimensional computer model to represent the positions of a moving object recorded in image data, and the image data is used to generate texture data for the surfaces to enable a representation to be displayed. The texture data may be the actual pixel data from the images of the object.

Embodiments of the invention will now be described, by way of example only, with reference to the accompanying drawings, in which:

DESCRIPTION

Figure 1:
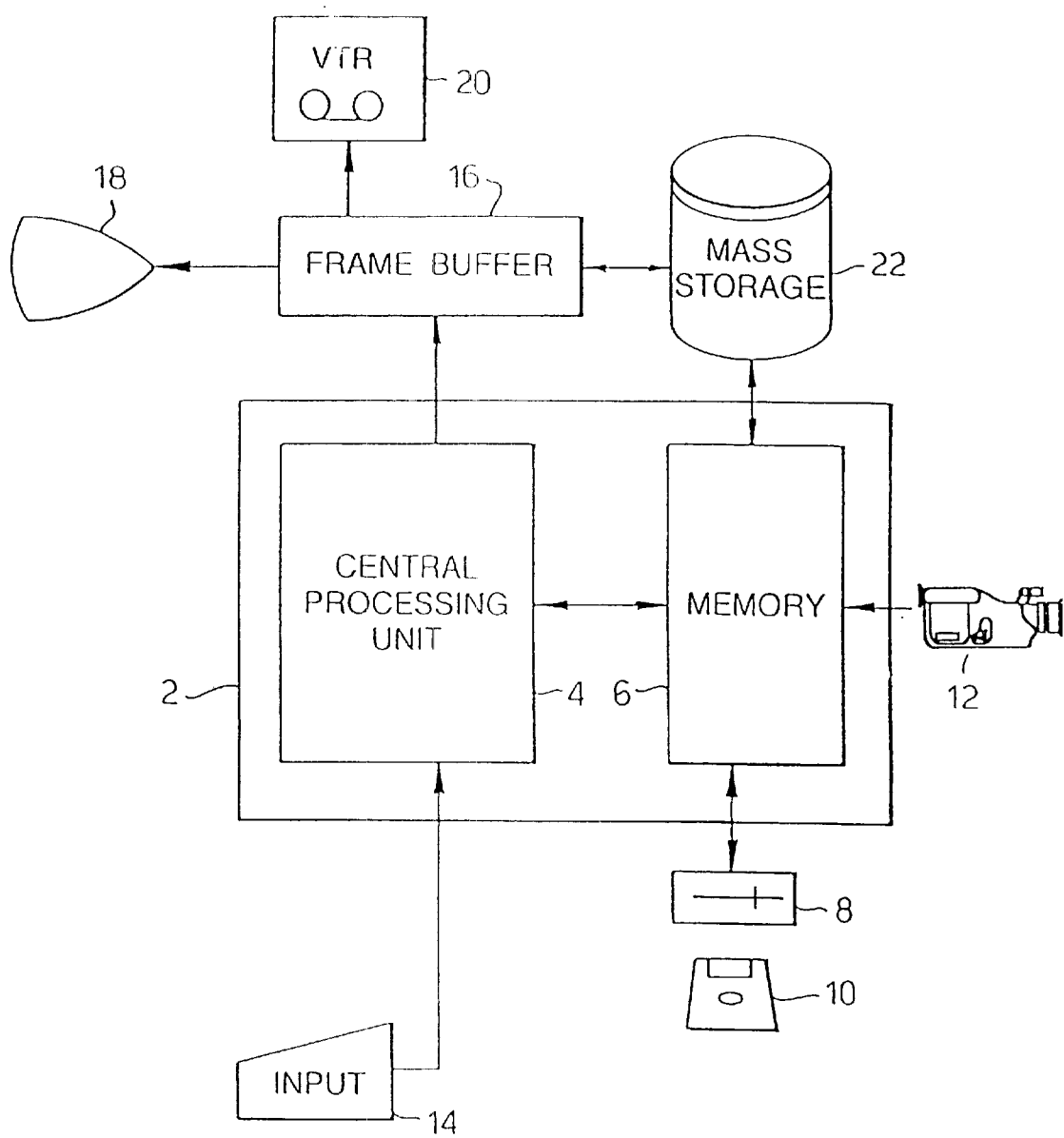
FIG. 1 schematically shows the components of an embodiment.

FIG. 1 is a block diagram showing the general arrangement of an image processing apparatus in an embodiment. In the apparatus, there is provided a computer 2, which comprises a central processing unit (CPU) 4 connected to a memory 6 operable to store a program defining the operations to be performed by the CPU 4, and to store object and image data processed by CPU 4.

Coupled to the memory 6 is a disk drive 8 which is operable to accept removable data storage media, such as a floppy disk 10, and to transfer data stored thereon to the memory 6. Operating instructions for the central processing unit 4 may be input to the memory 6 from a removable data storage medium using the disk drive 8.

Image data to be processed by the CPU 4 may also be input to the computer 2 from a removable data storage medium using the disk drive 8. Alternatively, or in addition, image data to be processed may be input to memory 6 directly from a video camera 12 having a digital image data output, such as the Sony DCR-PC7. The image data may be stored in camera 12 prior to input to memory 6, or may be transferred to memory 6 in real time as the data is gathered by camera 12. Image data may also be input from a non-digital video camera instead of digital camera 12. In this case, a digitiser (not shown) is used to digitise images taken by the camera and to produce digital image data therefrom for input to memory 6. In addition, image data may be downloaded into memory 6 via a connection (not shown) from a local or remote database which stores the image data.

Coupled to an input port of CPU 4, there is a user-instruction input device 14, which may comprise, for example, a keyboard and/or a position-sensitive input device such as a mouse, a trackerball, etc.

Also coupled to the CPU 4 is a frame buffer 16, which comprises a memory unit arranged to store image data relating to at least one image generated by the central processing unit 4, for example by providing one (or several) memory location(s) for a pixel of the image. The value stored in the frame buffer for each pixel defines the colour or intensity of that pixel in the image.

Coupled to the frame buffer 16 is a display unit 18 for displaying the image stored in the frame buffer 16 in a conventional manner. Also coupled to the frame buffer 16 is a video tape recorder (VTR) 20 or other image recording device, such as a paper printer or 35 mm film recorder.

A mass storage device, such as a hard disk drive, having a high data storage capacity, is coupled to the memory 6 (typically via the CPU 4), and also to the frame buffer 16. The mass storage device 22 can receive data processed by the central processing unit 4 from the memory 6 or data from the frame buffer 16 which is to be displayed on display unit 18.

The CPU 4, memory 6, frame buffer 16, display unit 18 and the mass storage device 22 may form part of a commercially available complete system, for example a workstation such as the SparcStation available from Sun Microsystems.

Operating instructions for causing the computer 2 to perform as an embodiment of the invention can be supplied commercially in the form of programs stored on floppy disk 10 or another data storage medium, or can be transmitted as a signal to computer 2, for example over a datalink (not shown), so that the receiving computer 2 becomes reconfigured into an apparatus embodying the invention.

Figure 2:
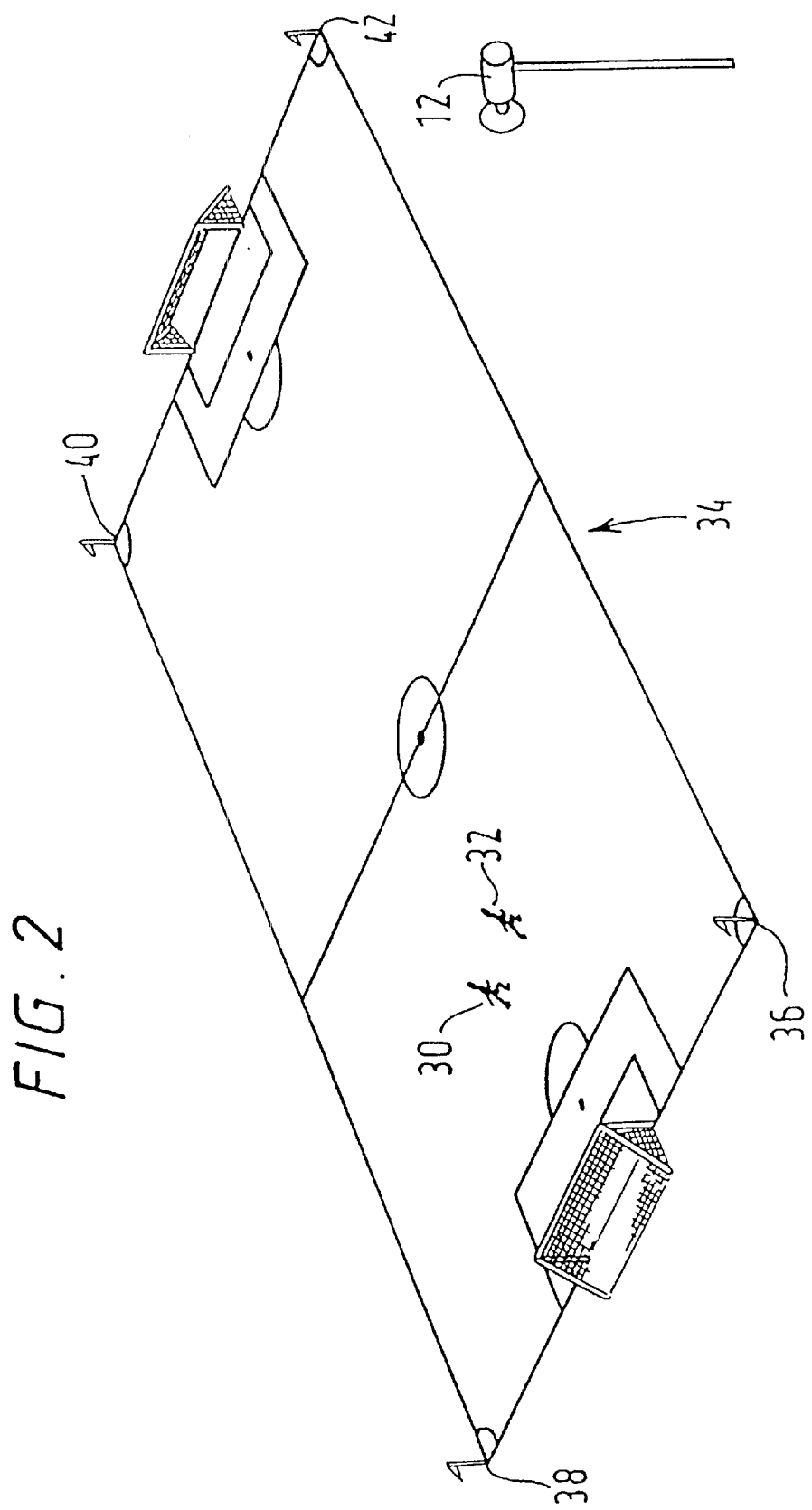
FIG. 2 schematically illustrates the collection of video data from a dynamic environment in an embodiment.

FIG. 2 schematically illustrates the collection of image data for processing by the CPU 4.

By way of example, FIG. 2 shows two people, 30, 32 moving on a football field 34. The field 34 and the movements of the people, 30, 32 thereon are recorded by video camera 12 which is mounted at a fixed viewing position and has a fixed viewing direction.

Figure 3:
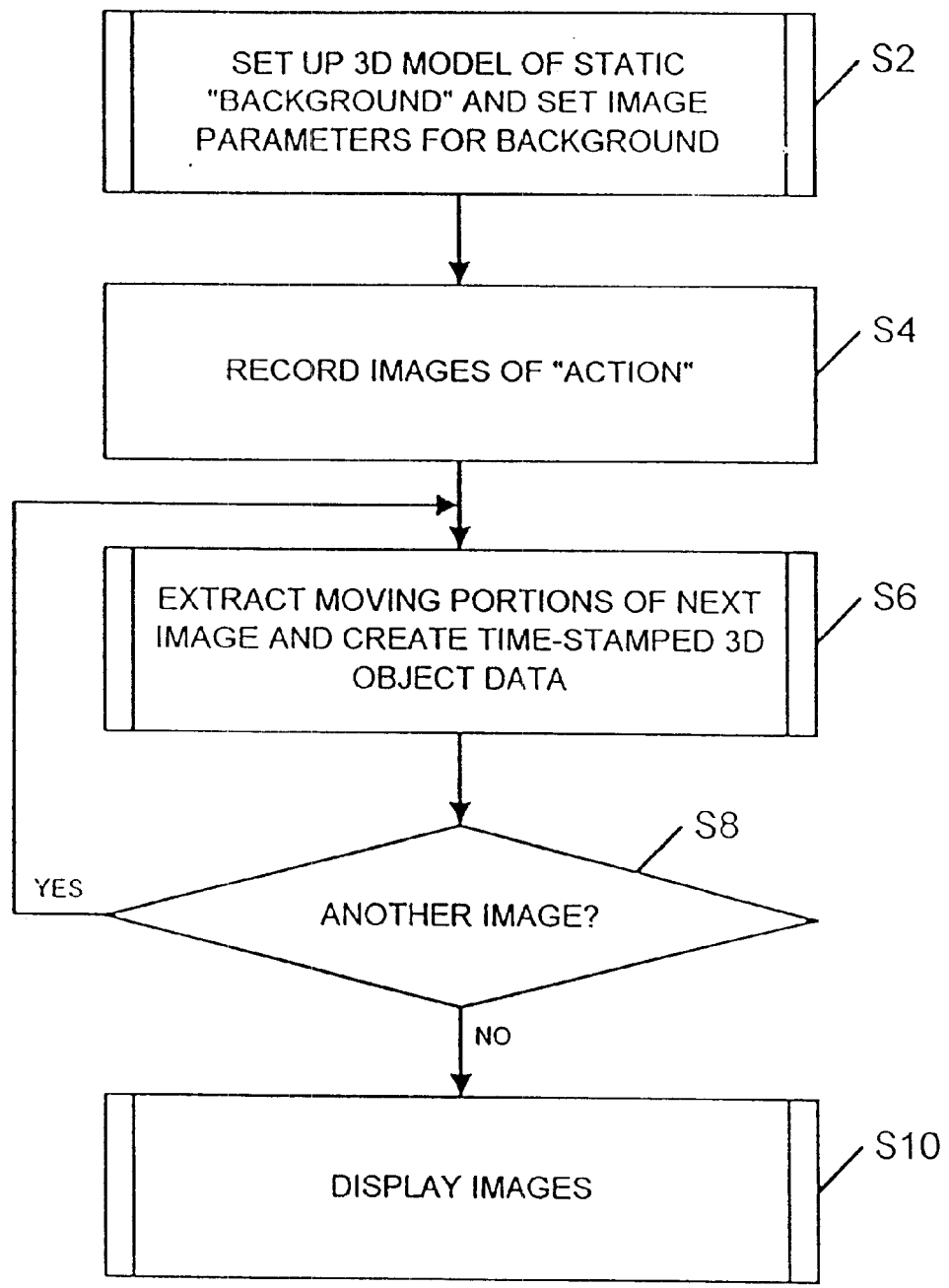
FIG. 3 shows, at a top level, the processing operations performed in an embodiment to process signals defining moving pictures, to create a three-dimensional computer model and to display images to a user from a desired viewing direction.

FIG. 3 shows the image processing operation performed in this embodiment.

Referring to FIG. 3, at step S2, a three-dimensional computer model of the static background (that is, non-moving parts) of the scene to be viewed by camera 12 is created by a user. Also at step S2, image parameters for the background scene are set.

Figure 4:
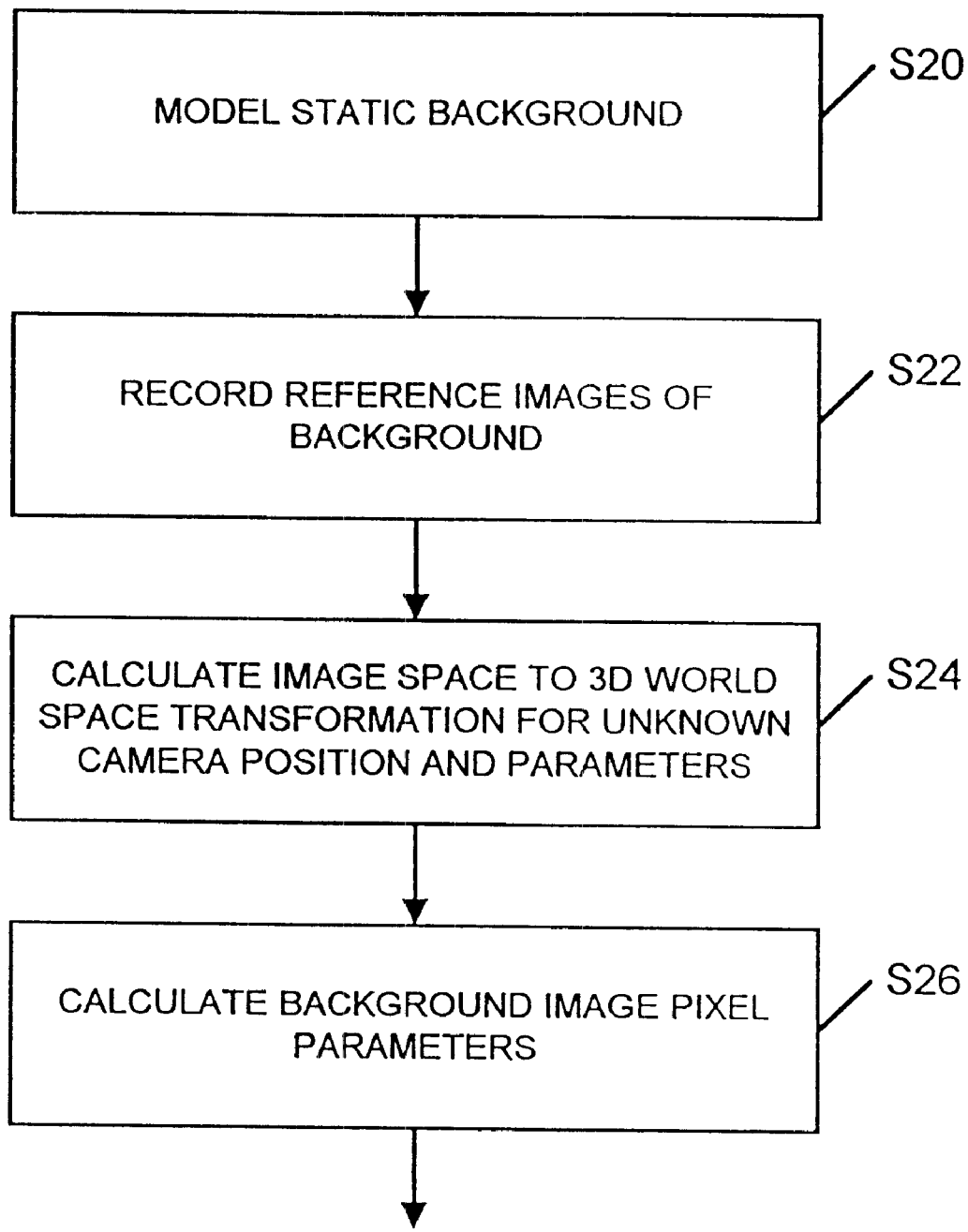
FIG. 4 shows the processing operations performed at step S2 in FIG. 3.

FIG. 4 shows in more detail the processing steps performed at step S2 in FIG. 3.

Referring to FIG. 4, at step S20, the static background is modelled. Thus, with reference to the example shown in FIG. 2, the football field 34 is modelled. This is carried out in a conventional way using a commercially available modelling package.

At step S22, a plurality of reference images of the static background are recorded using camera 12. In this embodiment, four frames of video are recorded by camera 12. A plurality of reference images are recorded to take account of temporal changes in the lighting conditions of the background, noise, and unwanted movements within the "static" background (which could be caused by moving branches and leaves on trees etc, for example) as will be explained further below.

At step S24, the transformation between image space (that is, an image recorded by camera 12) and three-dimensional (3D) world space (that is, the space in which the three-dimensional computer model was created at step S20) is calculated. The transformation defines a mapping between the ground plane (the plane upon which the objects move) in image space and the ground plane in the 3D world space (3D computer model). This transformation is calculated because the absolute position of the camera or the position of the camera relative to the scene being viewed (that is, the football field 34 in the example of FIG. 2) is not previously determined, and similarly the camera imaging parameters (focal length, size of the charge coupled device, zoom setting, etc) are not previously determined. The transformation enables a representation of an object to be created in the 3D computer model in a reliable and efficient way on the basis of the position and extents of the object in image space, as will be described later.

To calculate the transformation at step S24, one of the images of the background recorded at step S22 is displayed to a user on display device 18, and the user designates, upon prompting by CPU 4, a plurality of points (in this embodiment, four points) in the image which lie on a plane on which objects in the scene will move. Thus, referring to the example shown in FIG. 2, the corner points 36, 38, 40, 42 of the football field 34 may be designated (the field representing a surface on which the people 30, 32 will move). The points in the three-dimensional computer model created at step S20 corresponding to the points identified in the video image are also defined by the user. For example, a view of the three-dimensional computer model for a predetermined viewing direction may be displayed to the user on display device 18 and the corresponding points designated using the input means 14. Using the positions of the points designated in the video image and the positions of the corresponding points designated in the three-dimensional computer model, CPU 4 then calculates the transformation between image space and 3D world space in a conventional manner, for example using the equation:

$$\begin{pmatrix} X_n \\ Y_n \\ 1 \end{pmatrix} \simeq \begin{pmatrix} A & B & C \\ D & E & F \\ G & H & 1 \end{pmatrix} \begin{pmatrix} x_n \\ y_n \\ 1 \end{pmatrix} \quad (1)$$

where: n=1 ... 4; $X_n, Y_n$ are points in world space; $x_n, y_n$ are points in image space; and A–H are obtained by:

$$\begin{pmatrix} A \\ B \\ C \\ D \\ E \\ F \\ G \\ H \end{pmatrix} = \begin{pmatrix} x_1 & y_1 & 1 & 0 & 0 & 0 & -x_1X_1 & -y_1X_1 \\ 0 & 0 & 0 & x_1 & y_1 & 1 & -x_1Y_1 & -y_1Y_1 \\ x_2 & y_2 & 1 & 0 & 0 & 0 & -x_2X_2 & -y_2X_2 \\ 0 & 0 & 0 & x_2 & y_2 & 1 & -x_2Y_2 & -y_2Y_2 \\ x_3 & y_3 & 1 & 0 & 0 & 0 & -x_3X_3 & -y_3X_3 \\ 0 & 0 & 0 & x_3 & y_3 & 1 & -x_3Y_3 & -y_3Y_3 \\ x_4 & y_4 & 1 & 0 & 0 & 0 & -x_4X_4 & -y_4X_4 \\ 0 & 0 & 0 & x_4 & y_4 & 1 & -x_4Y_4 & -y_4Y_4 \end{pmatrix}^{-1} \begin{pmatrix} X_1 \\ Y_1 \\ X_2 \\ Y_2 \\ X_3 \\ Y_3 \\ X_4 \\ Y_4 \end{pmatrix} \quad (2)$$

This defines a transformation between the ground plane in image space and the ground plane in the 3D computer model (3D world space).

At step S26, CPU 4 calculates reference image pixel parameters for the static background. This is performed by calculating the mean grey level, $\mu$, for each pixel from the plurality of images recorded at step S22. That is, the grey level for corresponding pixels in each four frames is considered and the average taken. The variance, $\sigma$, of the determined mean is also calculated. A "window" for the grey level of each pixel is then set as $\mu \pm (2\sigma + F)$ where F is an error factor set to take account of variables such as the gain of video camera 12, and noise etc. In this embodiment, the total number of grey scale levels is 256, and the error factor F is set to five grey scale levels.

The "window" set at step S26 for each pixel represents the spread of grey scale values which the pixel should take if it forms part of an image of the static background (the viewing position and direction of video camera 12 being constant so that the grey scale value of a pixel forming part of the background should only change in dependence upon lighting changes and errors due to noise). As will be described below, these "windows" are used to identify objects moving over the background (and hence causing the pixel values to move outside the defined windows).

Referring again to FIG. 3, at step S4, images of "action", that is images in which there is movement of an object over the background (for example movement of FIGS. 30, 32 on the football field 34), are recorded by video camera 12.

At step S6, CPU 4 processes the image data for an image recorded at step S4 to identify objects in the image which are not part of the "static background", that is, objects which are moving over the background. CPU 4 then uses this information and the three-dimensional computer model defined at step S2 to create time-stamped three-dimensional object data representing a three-dimensional computer model of the scene recorded by camera 12.

Figure 5:
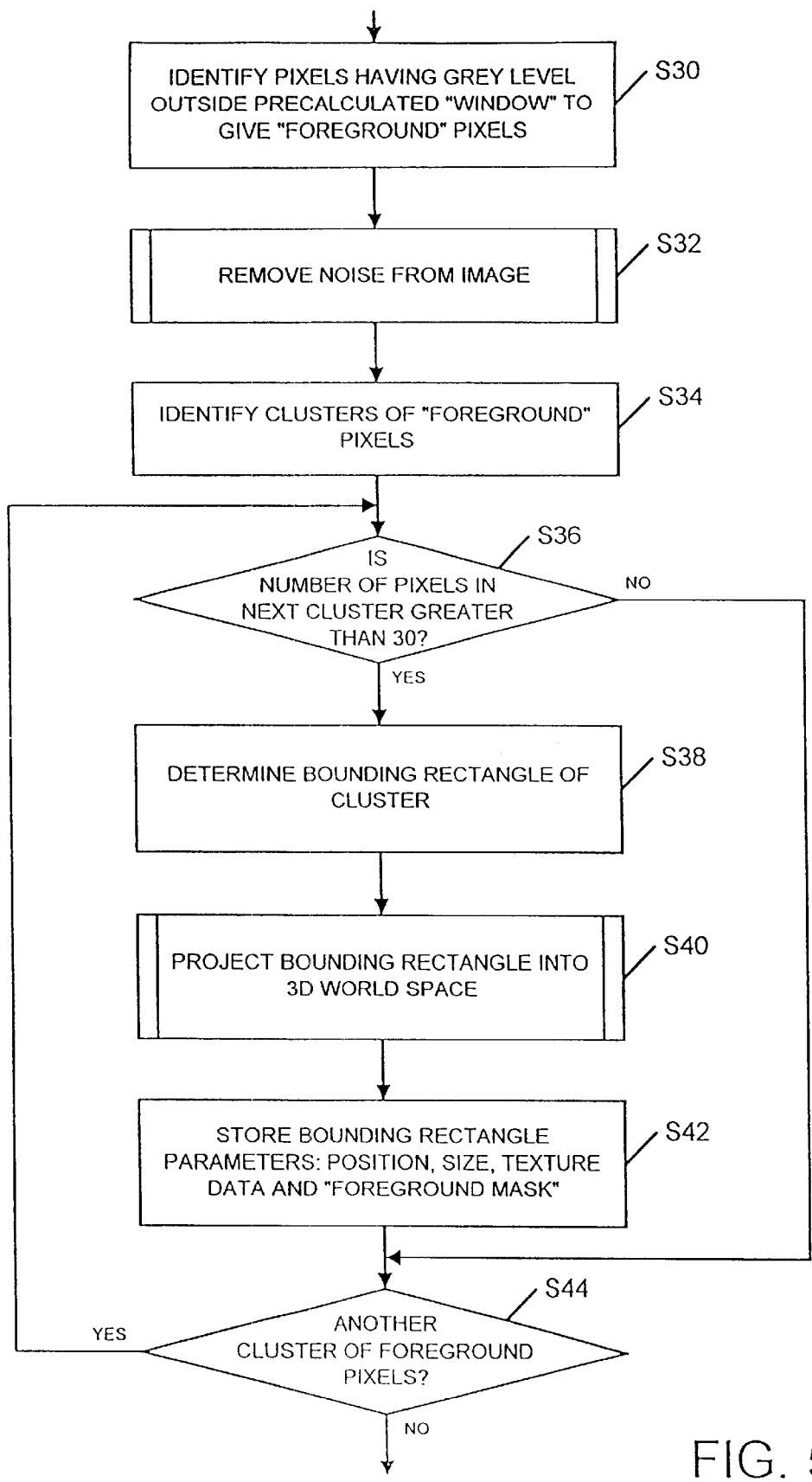
FIG. 5 shows the processing operations performed at step S6 in FIG. 3.

FIG. 5 shows the processing operations performed by CPU 4 at step S6.

Referring to FIG. 5, at step S30, CPU 4 compares the grey level of each pixel in the image data being processed with the grey scale "window" previously set at step S26 for the corresponding pixel in the image. Any pixel which has a grey level outside the predefined window for that pixel is considered potentially to be a "foreground" pixel, that is, a pixel which forms part of an object moving on the background. In step S30, CPU 4 therefore keeps a record of which pixels have grey scale levels outside the corresponding precalculated window.

At step S32, CPU 4 processes the image data to remove noise. Such noise may have been introduced into the image data in a number of ways; for example by quantum effects if video camera 12 is a charged coupled device (CCD) camera, by data compression techniques used to compress the data from camera 12, by a frame grabber used to capture frames of the video data for processing by CPU 4 etc, or may be noise which often occurs in image data near the boundaries of moving objects.

Figure 6:
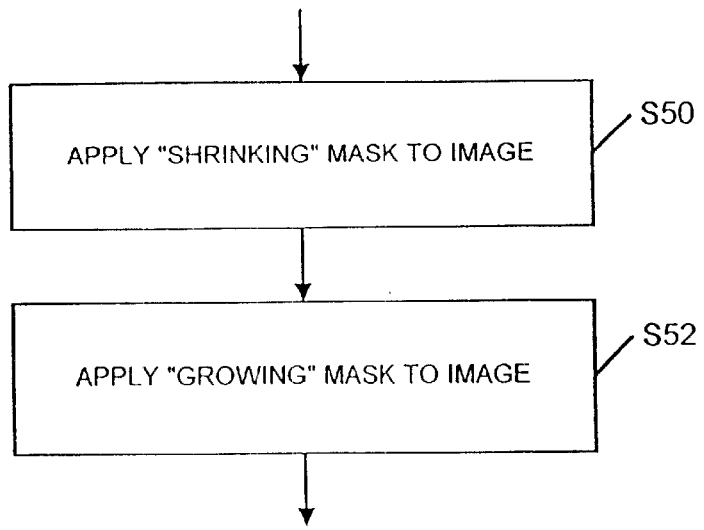
FIG. 6 shows the processing operations performed at step S32 in FIG. 5.

FIG. 6 shows the operations performed by CPU 4 in processing the image data to remove noise at step S32 in FIG. 5.

Referring to FIG. 6, at step S50, CPU 4 applies a "shrinking" mask to the image data in a conventional manner, for example as described in "Computer and Robot Vision Volume 2" by R. M. Haralick and L. G. Shapiro, Addison-Wesley Publishing Company, 1993 ISBN 0-201-56943-4 (v. 2), page 583. This operation involves applying a 3×3 pixel mask to the image data and counting the number of "foreground" pixels (identified in step S30) and the number of "background" pixels within each set of nine pixels defined by the mask. If the majority of pixels within the mask are background pixels, then the centre pixel is defined to be a background pixel (even if it was previously identified as a foreground pixel). No change is made if the majority of pixels within the mask are foreground pixels. This operation is repeated until the shrinking mask has been applied over the whole image data.

At step S52, CPU 4 applies a "growing mask" to the image in a conventional manner, for example as described in "Computer and Robot Vision Volume 2" by R. M. Haralick and L. G. Shapiro, Addison-Wesley Publishing Company, 1993 ISBN 0-201-56943-4 (v. 2), page 583. This operation is performed in the same way as step S50, with the exception that, if the majority of pixels within the mask are foreground pixels, then the centre pixel is defined to be a foreground pixel (even if it was previously identified as a background pixel) and no change is made if the majority of pixels within the mask are background pixels. The effect of step S52 is to return pixels which were erroneously set as background pixels by the shrinking mask operation in step S50 to foreground pixels.

Referring again to FIG. 5, at step S34, CPU 4 processes the data to identify clusters of foreground pixels. This is performed in a conventional manner for identifying clusters of pixels with the same characteristics by scanning the image data to identify a foreground pixel and then considering neighbouring pixels in an iterative manner to identify all connected foreground pixels.

At step S36, CPU 4 considers the next cluster of foreground pixels identified at step S34 (this being the first cluster the first time step S36 is performed) and determines whether the number of pixels in the cluster is greater than 30.

If the number of pixels is less than or equal to 30, the cluster is considered to represent noise since it forms a relatively small part of the overall image (768 pixels by 512 pixels in this embodiment). In this case, the cluster is not processed further. On the other hand, if the number of pixels in the cluster is greater than 30, then the cluster is considered to represent a moving object and further processing is performed.

At step S38, CPU 4 determines the extents of the cluster of pixels. In this embodiment, CPU 4 performs this operation by determining the bounding rectangle of the cluster within the two-dimensional image having sides parallel to the sides of the image.

At step S40, CPU 4 projects the bounding rectangle determined at step S38 into the three-dimensional world space in which the computer model was formed at step S20 using the transformation calculated at step S24. This produces a single plane in the three-dimensional computer model onto which the video image of the moving object will be projected for display to a user, as will be described below. In this embodiment, the plane in the three-dimensional computer model is vertical, and has its base on the surface within the 3D model defined by the points selected by the user at step S24 (since it is assumed that objects with the scene being viewed move on the corresponding real-world surface—the football field 34 in the example of FIG. 2).

Figure 7:
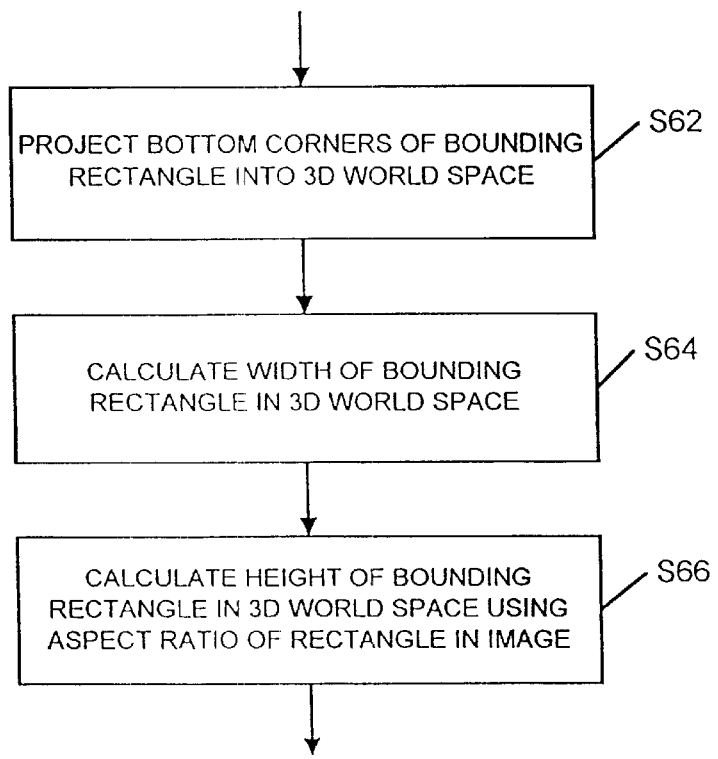
FIG. 7 shows the processing operations performed at step S40 in FIG. 5.

FIG. 7 shows the operation performed by CPU 4 in transforming the bounding plane at step S40 in FIG. 5.

Referring to FIG. 7, at step S62, CPU 4 projects the two corners of the bounding rectangle base from image space into three-dimensional world space by transforming the coordinates using the transformation previously calculated at step S24. Each corner of the bounding rectangle base is transformed to a point in the three-dimensional world space of the computer model which lies on the surface defined by the points previously selected at step S24.

At step S64, CPU 4 calculates the width of the bounding rectangle in three-dimensional world space by determining the distance between the corners transformed at step S62.

At step S66, CPU 4 calculates the height of the bounding rectangle in three-dimensional world space using the ratio of the width-to-height of the bounding rectangle in image space and the width in three-dimensional world space calculated at step S64 (that is, the aspect ratio of the bounding rectangle is kept the same in image space and three-dimensional world space).

Referring again to FIG. 5, at step S42 CPU 4 stores the position and size of the bounding rectangle in three-dimensional world space previously calculated at step S40, together with texture data for the bounding rectangle extracted from the bounding rectangle within the video image, and a "foreground mask", that is, a mask identifying which of the pixels within the bounding rectangle correspond to foreground pixels. The extracted texture data effectively provides a texture map for the bounding rectangle in the 3D world space.

At step S44, CPU 4 determines whether there is another cluster of foreground pixels identified at step S34 which has not yet been processed. Steps S36 to S44 are repeated until all clusters of foreground pixels for the video frame under consideration have been processed in the manner described above. At that stage, a three-dimensional computer model has been produced in which a single plane (bounding rectangle) has been placed to represent the position of each moving object, and texture image data for these moving objects has been stored for subsequent projection onto the planes in dependence upon a view point selected by a user. This data therefore corresponds to a three-dimensional computer model of a single two-dimensional image (video frame) from camera 12.

Referring again to FIG. 3, at step S8, CPU 4 determines whether there is another image (video frame) recorded by camera 12 at step S4 which has not yet been processed. Steps S6 and S8 are repeated until all images recorded by camera 12 at step S4 have been processed in the manner described above.

At step S10, CPU 4 displays images to a user on display device 18 from any desired viewpoint selected by the user.

The images displayed in this step by CPU 4 are simulated video images produced using the three-dimensional model object data previously created.

Figure 8:
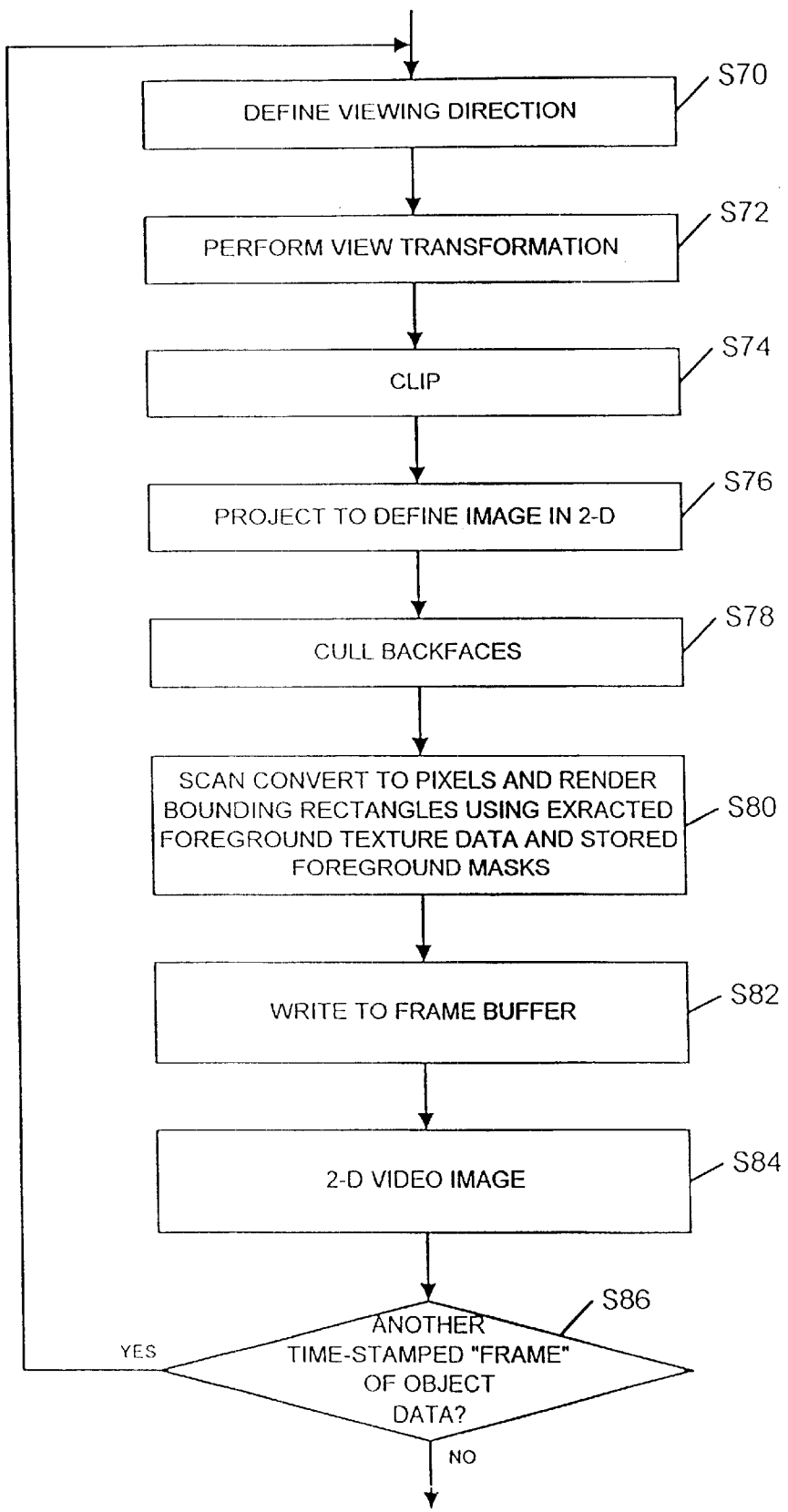
FIG. 8 shows the processing operations performed at step S10 in FIG. 3.

FIG. 8 shows the processing operations performed by CPU 4 in displaying the images at step S10.

Referring to FIG. 8, at step S70 the direction from which the object is to be viewed is defined by the user using input device 14.

At step S72, the 3D world space is transformed into a viewing space in dependence upon the viewing direction selected at step S70. This transformation identifies a particular field of view, which will usually cover less than the whole modelling space. Accordingly, at step S74, CPU 4 performs a clipping process to remove surfaces, or parts thereof, which fall outside the field of view.

Up to this stage, the object data processed by CPU 4 defines three-dimensional co-ordinate locations. At step S76, the vertices of the triangular surfaces making up the 3D computer model are projected to define a two-dimensional image.

After projecting the image into two dimensions, it is necessary to identify the triangular surfaces which are "front-facing", that is facing the viewer, and those which are "back-facing", that is cannot be seen by the viewer. Therefore, at step S78, back-facing surfaces are identified and culled. Thus, after step S78, vertices are defined in two dimensions identifying the triangular surfaces of visible polygons.

At step S80, the two-dimensional data defining the surfaces is scan-converted by CPU 4 to produce pixel values. In this step, as well as rendering the surfaces representing the background in the image, the bounding rectangles previously determined at step S40 are also rendered with the appropriate video texture data stored at step S42. Only foreground pixels within the bounding rectangle are rendered with the stored video texture data, these pixels being defined by the stored "foreground mask". The other pixels are rendered with background texture data. The rendered data produced by step S82 represents a simulated video frame, in which the background is produced from the computer model created at step S20 and each moving object is represented as a vertical plane extending from a horizontal surface of the background (the football field 34 in the example of FIG. 2) onto which the image data of the moving object extracted from the video image is projected.

At step S82, the pixel values generated at step S80 are written to the frame buffer on a surface-by-surface basis, thereby generating data for a complete two-dimensional image.

At step S84, CPU 4 generates a signal defining the pixel values. The signal is used to generate an image of the object on display unit 18 and/or is recorded, for example on a video tape in video tape recorder 20. (Further recordings of the generated images may be made from this video tape.) The signal may also be transmitted to a remote receiver for display or recording.

At step S86, CPU 4 determines whether there is another time-stamped "frame" of three-dimensional object data previously created at step S6 which has not yet been displayed to the user. Steps S70 to S86 are repeated until all such frames of object data have been displayed in the manner described above, thereby displaying a sequence of simulated moving images to the user from the desired viewing direction. Of course, the user can change the viewing direction at any time during the display.

Various modifications are possible to the embodiment described above.

Referring again to FIG. 3, in the embodiment above, step S6 (in which image data is processed to identify moving objects and to create object data therefrom) is performed after all images have been recorded at step S4. Similarly, step S10 (in which images are displayed) is performed after steps S6 and S8 have been completed. However, steps S4, S6 and S10 may be performed so as to allow real-time display of images to a user from a desired viewing direction. That is, step S6 and step S10 could be performed on one frame of video data while the next frame of data is being recorded by video camera 12. This real-time operation is possible since the processing requirements of steps S6 and S10 are not particularly onerous on CPU 4, and could be carried out within 1/30th of a second, this being the time between the recording of video frames.

In the embodiment above, moving objects are identified on the basis of grey scale values. However, in addition, or instead, it is possible to set windows for colour and/infra-red values and to identify foreground objects using these image characteristics.

In the embodiment above, a single video camera 12 is used to record the images to be processed by CPU 4. Similarly, a single bounding rectangle in 3D world space is calculated, onto which video image data is rendered. This system suffers from the problem that, if the user selects a viewing direction which lies in the plane of a bounding rectangle, then the moving object defined by that bounding plane is not displayed to the user (since it is "edge on" to the user). This problem may be addressed by using a plurality of cameras to simultaneously record images of "action" at step S4 and by representing each object by a plurality of planes, each touching the ground (for example vertical planes) connected to form a closed surface. The video image data to be rendered onto one of the planes for display to a user could then be selected by determining which video camera has a viewing direction closest to the normal of the bounding plane to be displayed (the video data from that camera then being used as texture data for the bounding rectangle).

In the embodiment above, image data is recorded by a single video camera 12 so that only data for surfaces of a moving object facing the camera is recorded. Accordingly, if the user selects a viewing direction at step S70 (FIG. 8) which is towards camera 12, then the video image data seen by camera 12 is rendered onto the bounding rectangle and displayed to the user even though the user should actually be displayed with an image of the opposite surface of the object. This problem may be overcome by using first and second cameras facing in opposite directions and by selecting the video data to be rendered onto the bounding rectangle by determining which video camera has a viewing direction closest to the viewing direction selected by the user (the video data from this camera then being rendered onto the bounding rectangle).

What is claimed is:

1. A method of processing image data defining a sequence of an object moving in a scene to produce signals defining a representation of the object at a plurality of positions in a three-dimensional computer model corresponding to positions of the object in the scene, the method comprising:

processing the image data for a plurality of the images to define for each image a respective bounding polygon that bounds the object in the respective image;

defining at least one planar surface within the three-dimensional computer model to represent each respective position of the object, each planar surface being defined with its base on a predetermined surface in the three-dimensional computer model and with a position and size in dependence upon a respective one of said bounding polygons; and generating texture data for the planar surfaces to represent features of the object in dependence upon the image data.

2. A method according to claim 1, wherein a bounding polygon in the image data has a width and an aspect ratio and a planar surface in the three-dimensional computer model has a width and a height, and wherein the width of a planar surface is determined by the width of the bounding polygon in the image data, and the height of the planar surface is calculated using the aspect ratio of the bounding polygon in the image data.

3. A method according to claim 1, wherein each planar surface lies within a vertical plane.

4. A method according to claim 1, wherein the bounding polygon bounding the object is a rectangle.

5. A method according to claim 4, wherein the rectangle has sides and the images has sides, and wherein the sides of the rectangle are parallel to the sides of the image.

6. A method according to claim 1, wherein a single planar surface is defined to represent each position of the object in the three-dimensional computer model.

7. A method according to claim 1, wherein a plurality of connected planar surfaces are defined to represent each position of the object in the three-dimensional computer model.

8. A method according to claim 1, wherein the image data is processed to extract a mask defining a position of the object within the bounding polygon.

9. A method according to claim 1, further comprising the step of creating the three-dimensional computer model.

10. A method according to claim 1, further comprising the step of processing the image data and data defining the three-dimensional computer model to identify a plurality of corresponding points therein, and to define a transformation between the image and the three-dimensional computer model using the corresponding points.

11. A method according to claim 1, further comprising the step of generating image data by rendering an image of the three-dimensional computer model from a chosen viewing direction, in which the texture data is rendered onto a said planar surface.

12. A method according to claim 11, further comprising the step of generating a signal conveying the image data.

13. A method according to claim 12, further comprising the step of recording the signal.

14. A method according to claim 11, further comprising the step of displaying an image of the object using the generated image data.

15. A method according to claim 11, further comprising the step of making a recording of the image data either directly or indirectly.

16. A method of creating a three-dimensional computer model of an object moving on a surface in a scene, comprising:

receiving image data defining a sequence of images of the object moving on the surface in the scene; and modelling the object using at least one planar surface having a position dependent upon a position of the object in the scene determined from an image of the scene and a transformation defining a mapping between the surface on which the object is moving and a predetermined surface in the three-dimensional computer model.

17. A method of modelling the movement of an object in a scene, comprising:

receiving image data defining a sequence of images of the object moving in the scene recorded by a recording device; and processing an image of the object without a priori knowledge of a position from which the image data was recorded by the recording device or imaging parameters of the recording device to generate a planar surface in a three-dimensional computer model of the scene and texture data for rendering onto the planar surface.

18. An image processing apparatus for processing image data defining a sequence of images of an object moving in a scene to produce signals defining a representation of the object at a plurality of positions in a three-dimensional computer model corresponding to positions of the object in the scene, comprising one or more processing components which, in use, are operable to:

process the image data for a plurality of the images to define for each image a respective bounding polygon that bounds the object in the respective image;

define at least one planar surface within the three-dimensional computer model to represent each respective position of the object, each planar surface being defined with its base on a predetermined surface in the three-dimensional computer model and with a position and size in dependence upon a respective one of said bounding polygons; and generate texture data for the planar surfaces to represent features of the object in dependence upon the image data.

19. Apparatus according to claim 18, wherein a bounding polygon in the image data has a width and an aspect ratio and a planar surface in the three-dimensional computer model has a width and a height, and wherein the one or more processing components define a planar surface such that the width of the planar surface is defined by the width of the bounding polygon in the image data and the height of the planar surface is determined using the aspect ratio of the bounding polygon in the image data.

20. Apparatus according to claim 18, wherein the one or more processing components define each planar surface so as to lie within a vertical plane.

21. Apparatus according to claim 18, wherein the bounding polygon bounding the object is a rectangle.

22. Apparatus according to claim 21, wherein the rectangle has sides and the images has sides, and wherein the sides of the rectangle are parallel to the sides of the image.

23. Apparatus according to claim 18, wherein the one or more processing components define a single planar surface to represent each position of the object in the three-dimensional computer model.

24. Apparatus according to claim 18, wherein the one or more processing components define a plurality of connected planar surfaces to represent each position of the object in the three-dimensional computer model.

25. Apparatus according to claim 18, wherein, in use, the one or more processing components also are operable to perform further processing to process the image data to extract a mask defining a position of the object within the bounding polygon.

26. Apparatus according to claim 18, wherein, in use, the one or more processing components also are operable to perform further processing to create the three-dimensional computer model.

27. Apparatus according to claim 18, wherein, in use, the one or more processing components also are operable to perform further processing to process the image data and data defining the three-dimensional computer model to identify a plurality of corresponding points therein, and to define a transformation between the image and the three-dimensional computer model using the corresponding points.

28. Apparatus according to claim 18, wherein, in use, the one or more processing components also are operable to perform further processing to render the texture data onto said planar surface to generate image data for an image of the three-dimensional computer model from a viewing direction.

29. Apparatus for creating a three-dimensional computer model of an object moving on a surface in a scene, comprising:

a receiver for receiving image data defining a sequence of images of the object moving on the surface in the scene; and a processor for modelling the object using at least one planar surface having a position dependent upon a position of the object in the scene determined from an image of the scene and a transformation defining a mapping between the surface on which the object is moving and a predetermined surface in the three-dimensional computer model.

30. Apparatus for modelling the movement of an object in a scene, comprising:

a receiver for receiving image data defining a sequence of images of the object moving in the scene recorded by a recording device; and a processor for processing an image of the object without a priori knowledge of a position from which the image data was recorded by the recording device or imaging parameters of the recording device to generate a planar surface in a three-dimensional computer model of the scene and texture data for rendering onto the planar surface.

31. An image processing apparatus for processing image data defining a sequence of images of an object moving in a scene to produce signals defining a representation of the object at a plurality of positions in a three-dimensional computer model corresponding to positions of the object in the scene, comprising processing means for:

processing the image data for a plurality of the images to define for each image a respective bounding polygon that bounds the object in the respective image;

defining at least one planar surface within the three-dimensional computer model to represent each respective position of the object, each planar surface being defined with its base on a predetermined surface in the three-dimensional computer model and with a position and size in dependence upon a respective one of said bounding polygons; and generating texture data for the planar surfaces to represent features of the object in dependence upon the image data.

32. Apparatus for creating a three-dimensional computer model of an object moving on a surface in a scene, comprising:

means for receiving image data defining a sequence of images of the object moving on the surface in the scene; and means for modelling the object using at least one planar surface having a position dependent upon a position of the object in the scene determined from an image of the scene and a transformation defining a mapping between the surface on which the object is moving and a predetermined surface in the three-dimensional computer model.

33. Apparatus for modelling the movement of an object in a scene, comprising:

means for receiving image data defining a sequence of images of the object moving in the scene recorded by a recording device; and means for processing an image of the object without a priori knowledge of a position from which the image data was recorded by the recording device or imaging parameters of the recording device to generate a planar surface in a three-dimensional computer model of the scene and texture data for rendering onto the planar surface.

34. A storage device storing a computer program for causing a programmable processing apparatus to become operable to perform a method according to any one of claims 1 to 17.

35. A signal conveying a computer program for causing a programmable processing apparatus to become operable to perform a method according to any one of claims 1 to 17.

* * * * *

UNITED STATES PATENT AND TRADEMARK OFFICE
CERTIFICATE OF CORRECTION

PATENT NO.   : 6,421,459 B1
DATED        : July 16, 2002
INVENTOR(S)  : Simon Michael Rowe It is certified that error appears in the above-identified patent and that said Letters Patent is hereby corrected as shown below:

Column 4,
Line 24, "(  3D" should read -- (3D --.

Column 5,
Line 7, "charged" should read -- charge --; and
Line 65, "extents" should read -- extent --.

Column 6,
Line 56, "view point" should read -- viewpoint --.

Column 8,
Line 55, "of an" should read -- of images of an --.

Column 9,
Line 18, "images" should read -- image --.

Column 10,
Line 46, "images" should read -- image --.

Signed and Sealed this

Twenty-ninth Day of April, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,421,459 B1
DATED : July 16, 2002
INVENTOR(S) : Simon Michael Rowe It is certified that error appears in the above-identified patent and that said Letters Patent is hereby corrected as shown below:

<u>Title page,</u>
Item [56], References Cited, FOREIGN PATENT DOCUMENTS

"EP 0 431 862 A2" should read -- EP 0 431 861 A2 --.

Signed and Sealed this

Second Day of November, 2004

JON W. DUDAS
*Director of the United States Patent and Trademark Office*